United States Patent [19]

Kiejzik

[11] 4,170,081
[45] Oct. 9, 1979

[54] NOVEL MICROFILM JACKET

[76] Inventor: Paul A. Kiejzik, c/o Motion Technology Corp., Mt. Pleasant Dr., Aston, Pa. 19104

[21] Appl. No.: 877,576

[22] Filed: Feb. 14, 1978

Related U.S. Application Data

[60] Continuation of Ser. No. 611,004, Sep. 8, 1975, Pat. No. 4,003,187, Division of Ser. No. 845,482, May 13, 1976, Pat. No. 4,123,891, Division of Ser. No. 845,483, May 13, 1976.

[51] Int. Cl.$^2$ ............................................. G09F 1/10
[52] U.S. Cl. ........................................ 40/159; 40/537; 206/455
[58] Field of Search ............ 229/72; 206/455; 150/39; 40/159, 10 D, 374, 375, 364, 537

[56] References Cited

U.S. PATENT DOCUMENTS

| 1,980,241 | 11/1934 | Wilson et al. | 229/72 |
|---|---|---|---|
| 2,003,854 | 6/1935 | Coy | 229/72 |
| 2,718,911 | 9/1955 | Solomon | 229/72 |
| 3,491,471 | 1/1970 | Semple | 40/16 |
| 3,553,439 | 1/1971 | Dorman | 40/159 |
| 3,705,464 | 12/1972 | Dahl, Jr. | 40/159 |
| 3,736,680 | 6/1973 | Dahl, Jr. | 40/159 |
| 3,759,305 | 9/1973 | McIntyre | 150/39 |
| 3,826,026 | 7/1974 | Bevan | 40/16 |
| 3,850,083 | 11/1974 | Falcon | 229/72 |
| 3,866,648 | 2/1975 | Anderson | 40/159 |

FOREIGN PATENT DOCUMENTS

| 1492571 | 11/1977 | Canada | 206/455 |
|---|---|---|---|
| 2026954 | 12/1971 | Fed. Rep. of Germany | 229/72 |

Primary Examiner—Stephen P. Garbe

[57] ABSTRACT

In a preferred embodiment a microfilm jacket having plural parallel channels, each channel having at its insert opening a protruding upper-lip forming an insert opening formed by a slit extending rearwardly on both of opposite sides of the protruding lips and serving to guide microfilm fed beneath the protruding upper lip into the insert opening, with the rearwardly-extending slits extending different distances for different parallel channels relative to either one or both rearwardly extending sides of the slit.

4 Claims, 13 Drawing Figures

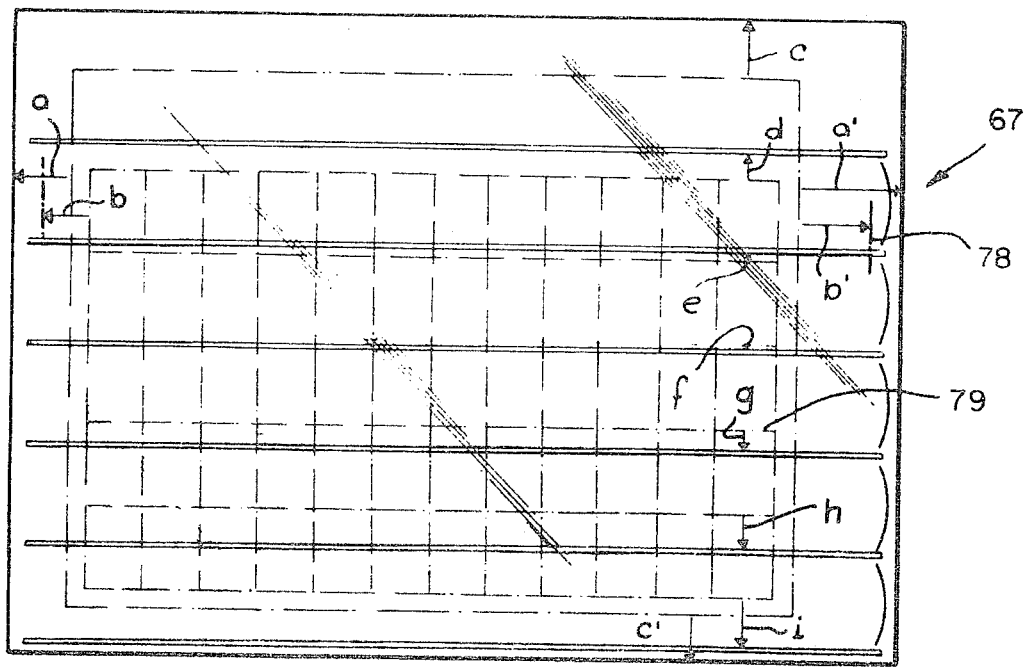
FIG. 8
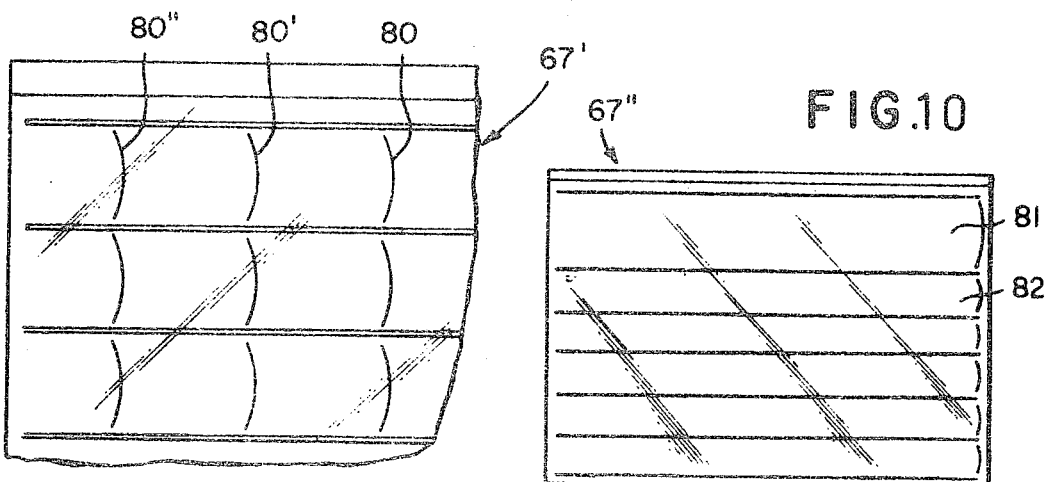
FIG. 9
FIG. 10
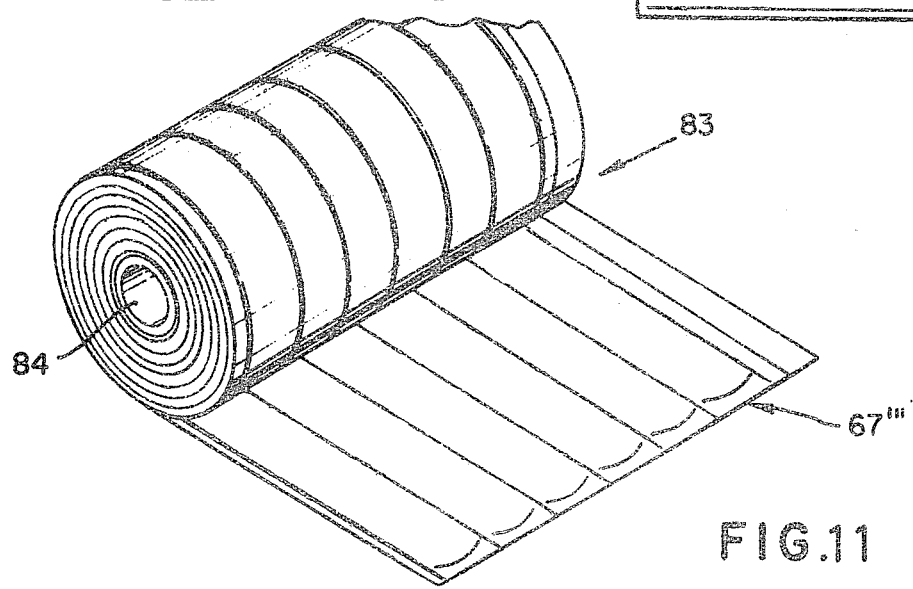
FIG. 11

NOVEL MICROFILM JACKET

This invention concerns a novel microfilm jacket, suited for a particularly advantageous manual or automatic or mechanical insertion of microfilms, and is a continuation of parent application U.S. Ser. No. 611,004 filed 09/08/75, issued Oct. 25, 1977 as U.S. Pat. No. 4,003,187, and of its divisionals U.S. Ser. No. 845,482 now U.S. Pat. No. 4,123,891 and U.S. Ser. No. 845,483 both divisionals filed on May 13, 1976.

BACKGROUND TO THE INVENTION

It is known that in the conventional microfilm jackets, in which the microfilm is inserted manually through a slit or through a cut in the appropriate jacket section, great care is required during the insertion of the microfilm to insure that the front corner or the front edge of the microfilm is correctly inserted between the two plates or as the case may be, below the upper plate of the microfilm jacket. This is a comparatively timeconsuming process. Furthermore in conventional microfilm jackets the ends of the microfilm stick out of the corresponding microfilm jackets thus being exposed to deteriorating influences and this is true particularly at the insertion slits of microfilm jackets which, for example, are provided with a recessed lip in order to facilitate the insertion of the microfilm.

SUMMARY OF THE INVENTION

The basic object for the invention was therefore to develop a novel microfilm jacket in which the insertion of the film, both in manual and mechanical operation, can be carried out faster and more effectively.

A further object was to make the welding seams more resistant from a mechanical point of view, in order to avoid tearing or separation of the welding seams.

Surprisingly enough, the object can be accomplished, pursuant to the invention, by providing in the lower plate of the individual microfilm jacket sections a convex introduction slit, i.e., one that is bent outward, with the lower plate of the microfilm jacket being manufactured preferably from a thicker or stronger material.

For further improvement of the strength of the ultrasonically manufactured welding seams between the individual sections of the microfilm jacket, the convex, i.e. bent outward, insertion slits are displaced from one another at the ends, or each insertion slit of each microfilm jacket section is arranged at a slightly oblique angle to the others.

The new microfilm jacket pursuant to the invention permits an easier, more accurate and faster insertion of the microfilm. Furthermore the danger of tearing the welding seams is reduced to a minimum.

Preferred embodiments of the microfilm jacket pursuant to the invention are explained in detail in the following description with the aid of the following drawings.

THE FIGURES

FIG. 8 is a typical embodiment of the microfilm jacket presented in FIG. 3 pursuant to the invention, which is presented in position above an international standard grid sheet.

FIG. 9 shows an in-part view of another, further improved embodiment of a microfilm jacket pursuant to the invention, similar to that shown in FIG. 3, with the exception that several successive insertion openings for conventional microfilm jacket sections or channels are located between the parallel welding seams.

FIG. 10 shows an altered embodiment of the microfilm jacket shown in FIG. 3 in a top view, with at least one of the microfilm jacket sections being substantially wider than the others.

FIG. 11 is a perspective partial view of an unrolled microfilm jacket band, which essentially corresponds to the embodiments shown in FIGS. 3 and 9.

Figure 1:
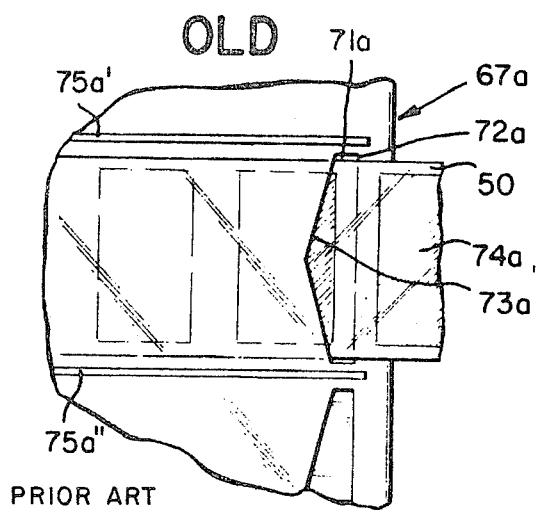
FIG. 1 is an in-part view of a conventional microfilm jacket having a recessed slit-opening, with the microfilm in the process of being inserted.

With the aid of the conventional microfilm jacket shown in FIG. 1, the differences between it and the novel and advantageous microfilm jacket pursuant to the present invention are to be described. The microfilm jacket 67a shown in FIG. 1 possesses a microfilm jacket section or microfilm jacket channel having a recessed-slit which is formed between two plastic sheets by means of the ultrasonic welds 75a and 75a''. In order to permit the introduction or insertion of the microfilm with a passably adequate speed, a cut-out section is used, which forms an opening 71a, which has a recessed lip 72a for the introduction of the microfilm 50. Until now the microfilms have for the most part been inserted by hand in the microfilm jacket sections. A particular disadvantage of the conventional microfilm jackets is that the microfilm frame 74a at the end of the film strip is not covered after the insertion of the sheet. As a result, in such conventional microfilm jackets 67a the end of the film strip remains free to move and is not completely shoved in beneath the upper sheet, beyond the cut-out opening 71a. As a result this part of the film strip can be damaged in the course of storage or use.

A further difficulty results from the fact that even in the case of the cut-out opening the upper and the lower sheets of the microfilm jacket are held closely together such that great care and a substantial expenditure of time are necessary in order for the user to insert each film individually by hand. With this kind of insertion care must be taken above all to insert the film strip in a proper manner between the upper and lower sheets of the microfilm jacket channerl structures. Particularly during the introduction or insertion of the front edge of the microfilm 50 great care must be used to insure that both corners of the front edge are introduced in each case under the separate bent sections of the lip 73a. If this is not done, one of the corners may move under the upper half of the lip 73a, while the latter does not get beneath the upper remaining half, in which case the microfilm end is blocked at the point where the two sections come together and cannot be introduced further, unless the microfilm is retracted and the insertion process is started afresh, in order to get both corners inserted under the upper sheet.

Figure 2:
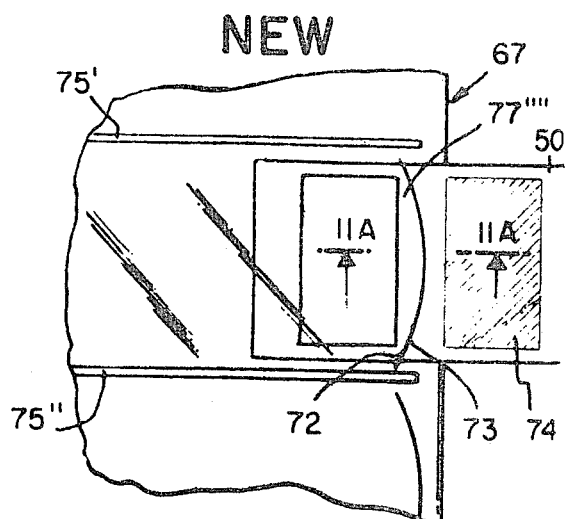
FIG. 2 is an in-part top view of the novel microfilm jacket pursuant to the present invention having a protruding upper lip to the slit-opening with rearwardly-extending sides to the upper lip.
Figure 5:
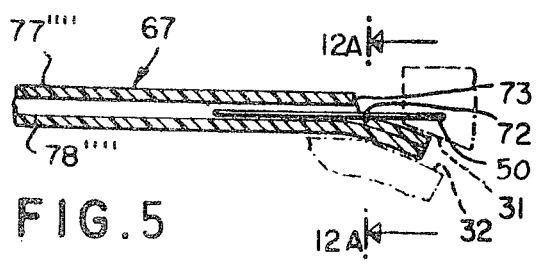
FIG. 5 is an in-part view along the line 11A—11A of FIG. 2 in a side cross section, with an insertion device indicated and the mechanism for the downward bending of the front edge of the microfilm jacket represented.

It can be seen from FIGS. 2 and 5, which represent a microfilm jacket pursuant to the invention, how a microfilm 50 is inserted with its edge 74 under the edge 73 of the upper lip and above the corresponding edge 72 of the lower lip of the microfilm jacket. A microfilm jacket channel-structure is formed between the two ultrasonic welds 75' and 75". The forward lower lip of the microfilm jacket is fixed in a downward bent position as shown in FIG. 5. This is achieved by exerting pressure on the lower surface 31 by a feeding or insertion device, to move the lower lip to the lower lip-position 31 to thereby expose or open widely the front edge of the microfilm jacket and produces by bending the insert-opening, i.e. the slit-opening of the insertion opening in order to leave the microfilm jacket channel structure free for the introduction or insertion of the microfilm 50.

Figure 6:
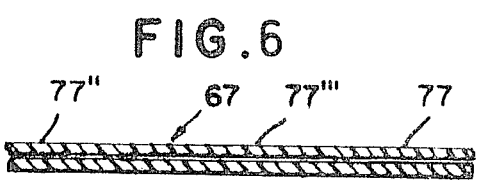
FIG. 6 is an in-part side cross section through the width of the microfilm jacket along the line 12—12 of FIG. 3.

From FIGS. 2,3,4,5,6, and 7 the technical characteristics of the microfilm jacket pursuant to the invention are illustrated in which it may be seen that no cut-out arranged in any way is provided to permit the introduction and insertion of the microfilm. Instead only one slit is made in the supper sheet, and thereby an extremely rapid and simple introduction or insertion of the microfilm is made possible. The advantageous construction of this insertion element in the microfilm jacket pursuant to the invention (see FIGS. 3 and 4) has the result that the slit is completely closed again after the insertion of the film and any penetration by dust, moisture and the like is prevented, the microfilm being insulated in an advantageous manner from the environment. As a result of the special construction and fit of the microfilm jacket channel-structure the inserted microfilm frames or the inserted microfilm has a secure seat within the microfilm jacket channel structure. By means of this embodiment the microfilms or microfilm frames can be inserted and advanced as far as desired, but also correspondingly be retracted, both manually and mechanically/automatically. FIG. 6 shows the empty microfilm jacket section of FIG. 3 along the line 12—12 of FIG. 3.

Figure 7:
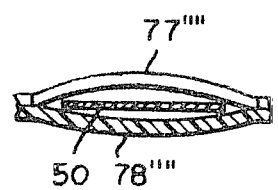
FIG. 7 is an in-part cross section through the open insertion opening of the microfilm jacket along the line 12A—12A of FIG. 5.

FIG. 7 shows a typical position of the embodiment of the microfilm jacket pursuant to the invention shown in FIG. 5 when it is flexed, and in particular the slit-opening or insertion opening along the line 12A—12A of FIG. 5.

Figure 3:
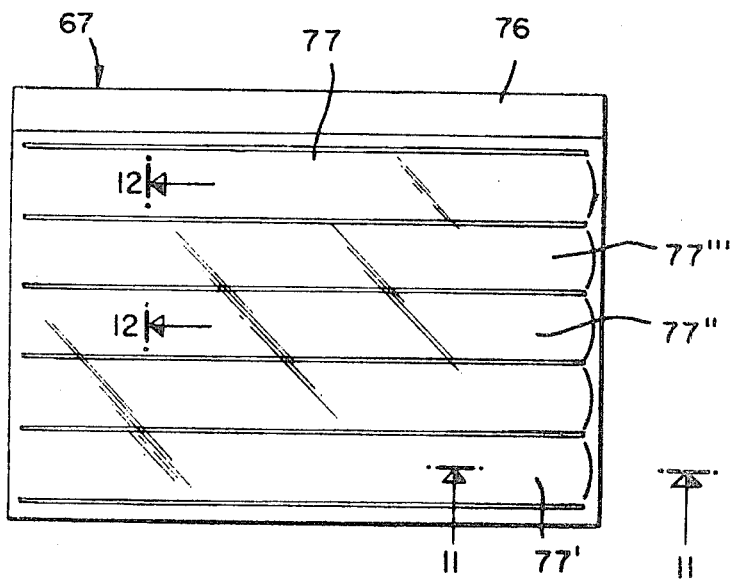
FIG. 3 shows the entire novel microfilm jacket pursuant to the invention in a top view.
Figure 4:
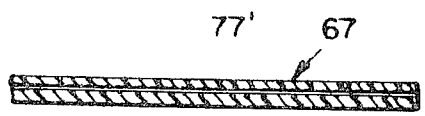
FIG. 4 is an in-part lateral cross section along the line 11—11 of FIG. 3.

In FIG. 8 an embodiment of the microfilm jacket pursuant to the invention, as it is shown in FIG. 3, is placed upon an international standard grid. From this it may be seen that the present microfilm jacket pursuant to the invention corresponds to the international standard requirements. The microfilm jacket sections 78 and 79 of the microfilm jacket 67 have between them the same width, which corresponds to the international standard grid.

In FIG. 9 a further embodiment of the microfilm jacket pursuant to the invention is respresented. This microfilm jacket has, instead of one slit-opening at the edge several insertion slits 80, 80' and 80" for an individual microfilm jacket channel structure. The distances between the serially-arranged spaced-apart individual insertion slits can be predetermined as might be desired.

In FIG. 10 a further embodiment of the microfilm jacket pursuant to the invention is represented, in which microfilm jacket channel structures of varying widths are used. The microfilm jacket channel-structure 82 is an example of a jacket channel structure with a normal width, while the microfilm jacket channel structure 81 has an extra width, into which films can be inserted that have a greater width than the other microfilms.

FIG. 11 shows how the microfilm jacket pursuant to the invention can be used in the form of a roll 83, which is wound on an axle 84. The microfilm jacket edge 67''' is formed repeatedly thoughout the whole roll at the desired intervals and the individual microfilm jacket can be separated from one another easily, by perforations, for example.

Figure 12:
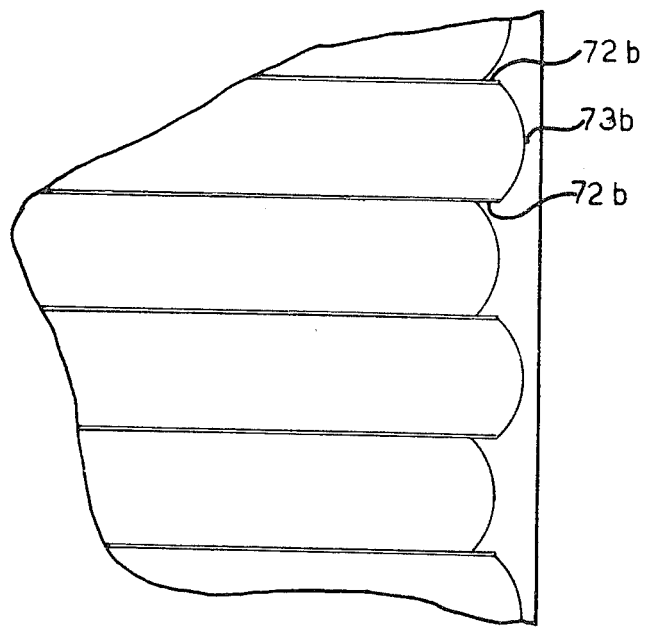
FIG. 12 shows an in-part view of a further embodiment of a microfilm jacket pursuant to the invention, in which the convex or bent insertion openings are displaced on one side or at one end in order to prevent tearing of the microfilm jacket at the welding seams.

In FIG. 12 a further embodiment of the microfilm jacket pursuant to the invention is represented, in which the introduction or insertion slits 73b are staggered so that the corners or the ends 72b of the slits rearwardly-extending sides are staggered. By means of this stabilization, any tearing of the material or the ultrasonic welds is prevented to the maximum extent, because no two adjacent jacket channel structures have identically-placed adjacent corners or ends of ends of the rearwardly-estending sides of the upper lips of the slit-opening.

Figure 13:
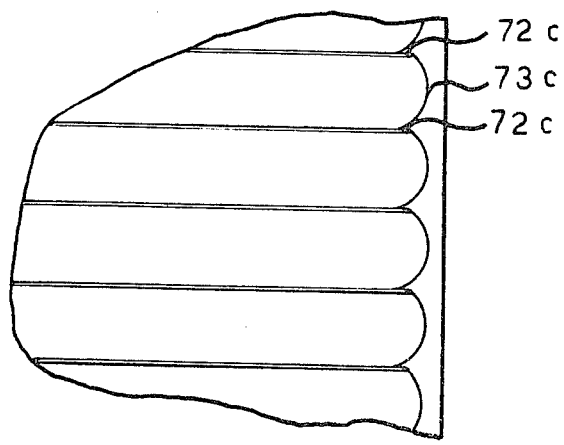
FIG. 13 is an in-part view in elevation top plan view of a preferred embodiment.

In FIG. 13 a further preferred embodiment of the microfilm jacket pursuant to the invention is represented in which the slit-opening or insertion slits 73c are constructed so as to be somewhat canted. As a result of the fact that the corners or ends 72c of the rearwardly-extending walls of the upper lips of the slit-openings or insertion slits 73c are surrounded by the sheet material, whereby there is a further stabilization, as a result of which, likewise, tearing of the microfilm jacket and, in particular, of the lower welding seams during use, is prevented.

It is withing the scope of the present invention to make variations and substitutions of equivalents to the extent obvious to a person of ordinary skill in this art.

I claim:

1. A microfilm jacket utilizable for machine insertion of a microfilm strip at one end into and through a through-passage, storage, and machine removal from a far open end, comprising in combination: upper and lower elongated sheets joined at spaced apart lines forming a plurality of storage channels parallel to each other, each said storage channel extending along a longitudinal axis of the sheets and having an outlet open-end to said storage channel formed at a point between the upper and lower elongated sheets at a distal outlet end of said storage channel, and each storage channel having a normally-closed insert-opening arced slit formed by slit structure in the upper elongated sheet, with the normally closed insert-opening arced slit extending transversely to said longitudinal axis, the slit structure consisting of: (a) first section of the upper elongated sheet having an upper convex lip and (b) a second section of the upper elongated sheet having a lower concave lip in opposing relationship to the upper convex lip, the normally-closed insert-opening arced slit being at an opposite proximate end of said upper elongated sheet, the upper convex lip extending towards the proximate end; each upper convex lip along with its respective lower concave lip, storage channel, and outlet open-end jointly forming a through-passage conduit, each through-passage conduit having a normally-closed insert-opening arced slit adapted to form an insertion open-space to the through-passage conduit when the second portion at the lower concave lip is pressed downwardly sufficiently to form an angle with the first section at the upper convex lip whereby a microfilm strip is insertable through each insertion open-space into its respective storage channel and through its respective through-passage conduit, each normally-closed insert-opening arced slit extending between and up-to its respective spaced-apart lines, the ends of each insert-opening arced slit being staggered relative to the ends of the arced slits which lie in adjacent through-passage conduits so that the promulgation of tear lines caused by alignment of said ends will be retarded or prevented.

2. A microfilm jacket of claim 1, in which one upper and a lower sheets are plastic elongated sheets and have differing thicknesses, the lower sheet being thicker.

3. A microfilm jacket of claim 1, in which the microfilm jacket channel structures have different widths from one-another.

4. A microfilm jacket of claim 3, in which the microfilm jacket structures include a series of spaced-apart ones of said slit-openings, the series of slit-openings following one-another for at least one of the microfilm jacket channel structures.

* * * * *